(12) United States Patent
Long

(10) Patent No.: US 8,567,277 B2
(45) Date of Patent: Oct. 29, 2013

(54) TRANSMISSION DEVICE

(75) Inventor: Bo Long, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 602 days.

(21) Appl. No.: 12/858,553

(22) Filed: Aug. 18, 2010

(65) Prior Publication Data

US 2011/0120246 A1    May 26, 2011

(30) Foreign Application Priority Data

Nov. 20, 2009 (CN) .......................... 2009 1 0310122

(51) Int. Cl.
*F16H 57/12* (2006.01)

(52) U.S. Cl.
USPC .................... 74/392; 74/409; 74/399; 74/395

(58) Field of Classification Search
USPC ......... 74/409, 392, 395, 425, 388 PS; 901/26
See application file for complete search history.

(56) References Cited

U.S. PATENT DOCUMENTS

| | | | | |
|---|---|---|---|---|
| 4,106,366 A | * | 8/1978 | Altenbokum et al. | 475/344 |
| 4,524,643 A | * | 6/1985 | Ziegler et al. | 475/345 |
| 4,677,908 A | * | 7/1987 | Imanishi et al. | 100/346 |
| 4,788,878 A | * | 12/1988 | Morita et al. | 74/422 |
| 4,827,789 A | * | 5/1989 | Hallidy et al. | 74/89.27 |
| 4,843,904 A | * | 7/1989 | Moore | 74/396 |
| 4,885,950 A | * | 12/1989 | Smith | 74/409 |
| 4,916,962 A | * | 4/1990 | Tsutsumi et al. | 74/392 |
| 4,944,195 A | * | 7/1990 | Takahashi et al. | 74/409 |
| 4,979,404 A | * | 12/1990 | Nakata et al. | 74/409 |
| 5,189,923 A | * | 3/1993 | Lashbrook | 74/409 |
| 5,251,505 A | * | 10/1993 | Castellani | 74/392 |
| 5,401,220 A | * | 3/1995 | Heller | 475/180 |
| 5,718,149 A | * | 2/1998 | Phillips | 74/422 |
| 6,585,446 B2 | * | 7/2003 | Kaneko | 403/374.1 |
| 7,100,734 B2 | * | 9/2006 | Segawa | 180/444 |
| 7,487,984 B1 | * | 2/2009 | Lemont et al. | 280/93.514 |
| 7,665,378 B2 | * | 2/2010 | Nakamura et al. | 74/388 PS |
| 8,181,549 B2 | * | 5/2012 | Watanabe et al. | 74/458 |
| 2002/0096005 A1 | * | 7/2002 | Oka et al. | 74/388 PS |
| 2002/0148315 A1 | * | 10/2002 | Mittendorf et al. | 74/425 |

(Continued)

FOREIGN PATENT DOCUMENTS

| | | |
|---|---|---|
| CN | 2188593 Y | 2/1995 |
| CN | 1673847 A | 9/2005 |

*Primary Examiner* — Troy Chambers
*Assistant Examiner* — Valentin Craciun
(74) *Attorney, Agent, or Firm* — Altis & Wispro Law Group, Inc.

(57) ABSTRACT

A transmission device includes a gear case, a first gear, a second gear and a backlash adjusting mechanism. The first gear, the second gear and a backlash adjusting mechanism are received in the gear case. The first gear includes a shaft. The second gear is meshed with the first gear. Both of the first gear and the second gear are bevel gears. The backlash adjusting mechanism includes a resilient member and fastening member. The fastening member passes through the gear case. The resilient member resists the fastening member and an end of the shaft of the first gear, respectively. An elastic variation of the resilient member is changed or adjusted by the fastening member, such that a backlash between the first gear and the second gear is adjusted via the resilient member.

20 Claims, 4 Drawing Sheets

(56) References Cited

U.S. PATENT DOCUMENTS

| | | | |
|---|---|---|---|
| 2002/0195893 A1* | 12/2002 | Kobayashi et al. | 310/83 |
| 2003/0136211 A1* | 7/2003 | Ishii et al. | 74/388 PS |
| 2004/0045386 A1* | 3/2004 | Saruwatari et al. | 74/388 PS |
| 2007/0209463 A1* | 9/2007 | Song et al. | 74/388 PS |
| 2010/0018337 A1* | 1/2010 | Kawakubo et al. | 74/422 |
| 2011/0107867 A1* | 5/2011 | Long | 74/490.05 |
| 2011/0120245 A1* | 5/2011 | Long | 74/409 |
| 2013/0075189 A1* | 3/2013 | Sekikawa et al. | 180/444 |

\* cited by examiner

TRANSMISSION DEVICE

BACKGROUND

1. Technical Field

The present disclosure relates to transmission devices, and particularly, to a transmission device that can adjust a backlash between meshed gears.

2. Description of the Related Art

Transmission devices include a number of meshed gears. Backlash is defined as the rotational arc clearance between a pair of meshed gears. Some amount of backlash is necessary in order to permit relative motion between the two meshed gears and to prevent damage from interference. Lack of backlash may cause noise, overloading, overheating of gears, and even seizing and failure. Gears without backlash will not work when the temperature is raised to a particular amount.

A transmission device includes a gear case, a first gear, a second gear, and a backlash adjusting mechanism. The backlash adjusting mechanism is used to adjust a backlash between the first gear and the second gear. It includes a fixing bracket, a compression spring and a sliding bracket. The sliding bracket slides toward the second gear to resist the compression spring, so the backlash between the first gear and the second gear can be decreased. However, to adjust the backlash between the first gear and the second gear, the gear case must first be opened to adjust the amount of compression for the compression spring, thereby adjusting the gap between the first gear and the second gear. Therefore, to adjust the backlash between the first gear and the second gear is an inconvenient task.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

Figure 1:
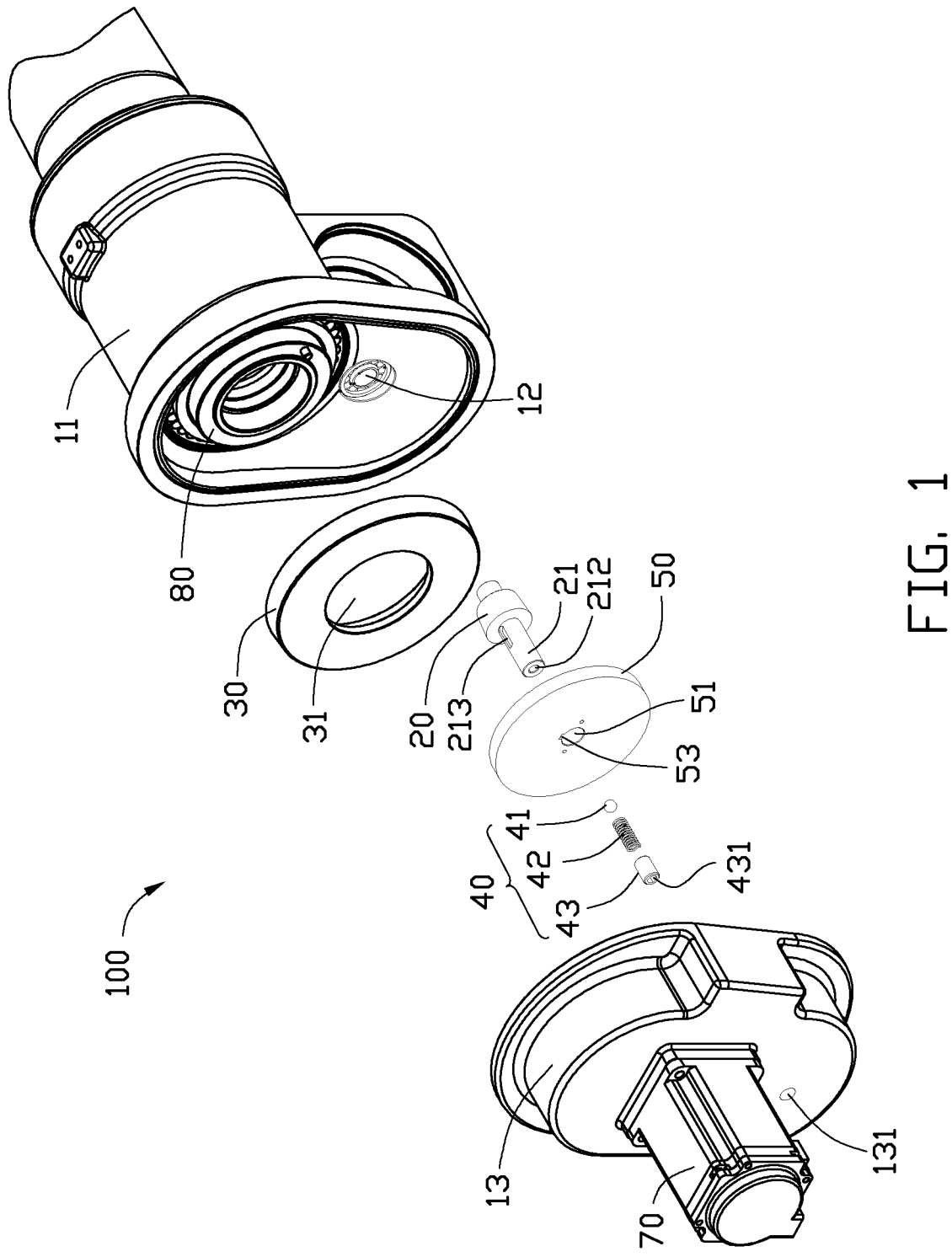
FIG. 1 is an exploded, isometric view of one embodiment of a transmission device.
Figure 3:
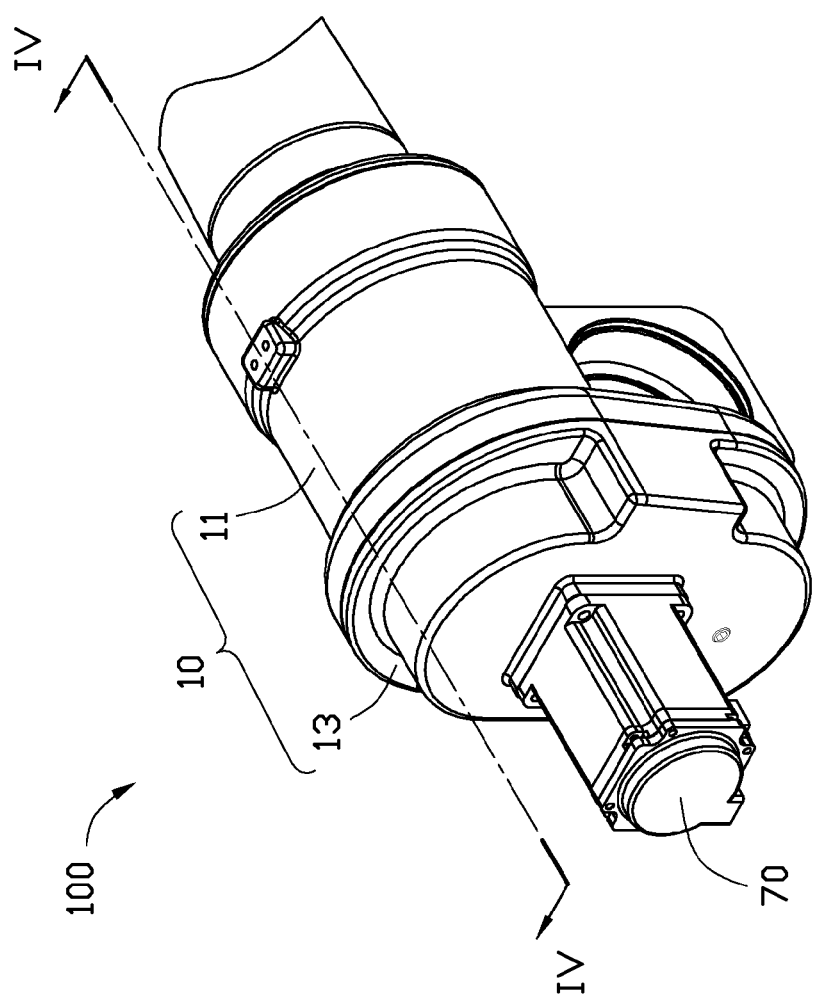
FIG. 3 is an assembled, isometric view of the transmission device shown in FIG. 1.

Referring to FIGS. 1 and 3, one embodiment of a transmission device 100 includes a gear case 10, a first gear 20, a second gear 30, a backlash adjusting mechanism 40, a third gear 50, a fourth gear 60, a driving member 70 and an output shaft 80. The first gear 20, the second gear 30, the backlash adjusting mechanism 40, the third gear 50 and the fourth gear 60 are all received in the gear case 10. The output shaft 80 rotatably passes through the gear case 10. The second gear 30 is fixed to the output shaft 80. The first gear 20 is meshed with the second gear 30. The third gear 50 is meshed with the fourth gear 60. The driving member 70 is fixed on an outer surface of the gear case 10. The fourth gear 60 is pivotally connected to the driving member 70. The backlash adjusting mechanism 40 is used to adjust a backlash between the first gear 20 and the second gear 30.

The gear case 10 includes a casing 11, a bearing 12 and a cover 13. The cover 13 is sealed on the casing 11. The output shaft 80 rotatably passes through the casing 11. The bearing 12 is disposed in the casing 11. The cover 13 defines a threaded hole 131 corresponding to the bearing 12. The cover 13 includes a bearing 132 disposed on an inner surface of the cover 13 (Referring to FIG. 2). When the cover 13 is mounted on the casing 11, the bearing 12 is arranged correspondingly to the bearing 132.

In the illustrated embodiment, the first gear 20 is a bevel gear having a shaft 21 along an axis thereof. The shaft 21 can be rotatably passed through the bearing 12 of the gear case 10. The shaft 21 defines a receiving hole 212 in an end surface of a larger end of the shaft 21. The receiving hole 212 is a blind hole. The shaft 21 includes a positioning protrusion 213 located on a side surface of the shaft 21 adjacent to the larger end of the first gear 20.

The second gear 30 is a bevel gear, and is meshed with the first gear 20. The second gear 30 defines a shaft hole 31 in a middle portion of the second gear 30. The shaft hole 31 is substantially circular. An outside diameter of the second gear 30 is larger than that of the first gear 20.

The backlash adjusting mechanism 40 includes a positioning member 41, a resilient member 42 and a fastening member 43. The positioning member 41 and the resilient member 42 are received in the receiving hole 212 of the shaft 21 in that order. The fastening member 43 passes through the cover 13 of the gear case 10, and resists the resilient member 42. In the illustrated embodiment, the positioning member 41 is a guide ball. The resilient member 42 is a substantially cylindroid compression spring. The fastening member 43 is an adjusting screw engaging in the threaded hole 131 of the cover 13. The resilient member 42 sleeves on the positioning member 41. The fastening member 43 defines an adjusting hole 431 in an end surface of the fastening member 43. A portion of the fastening member 43 received in the threaded hole 131 can be adjusted by a tool, such as a screw driver (not shown) for obtaining appropriate screw position.

The third gear 50 defines a shaft hole 51 and a positioning groove 53 adjacent to the shaft hole 51 at the periphery. The shaft hole 51 is substantially circular. The shaft 21 of the first gear 20 passes through the shaft hole 51, and the positioning protrusion 213 engages in the positioning groove 53, such that the third gear 50 drives the first gear 20 to rotate.

Figure 2:
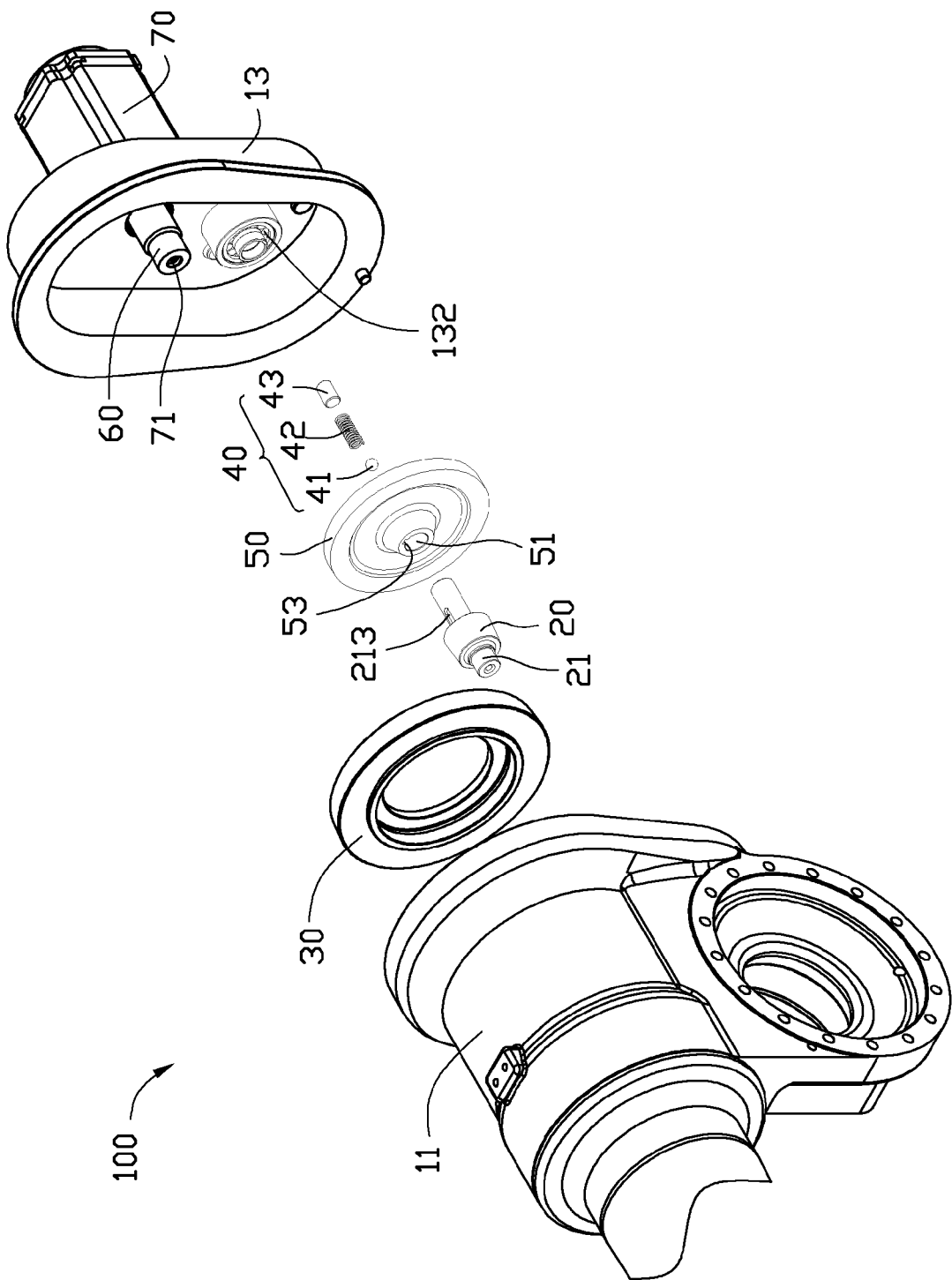
FIG. 2 is similar to FIG. 1, but viewed from another aspect.

Referring to FIG. 2, the driving member 70 is a motor including a drive shaft 71. The drive shaft 71 is passed though the cover 13 of the gear case 10. The fourth gear 60 is fixedly sleeved on the drive shaft 71 of the driving member 70.

Figure 4:
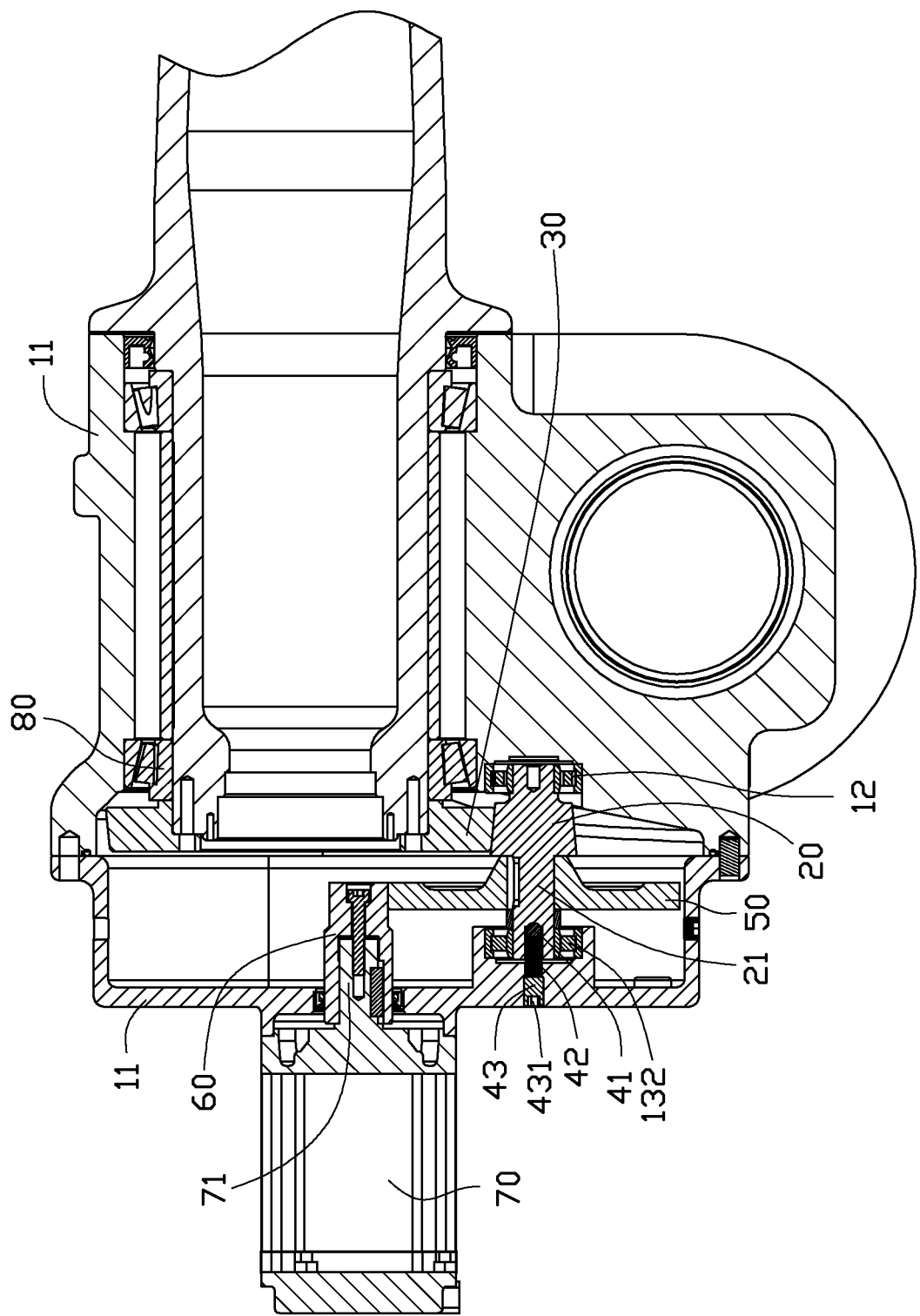
FIG. 4 is a cross-sectional view taken along line IV-IV of FIG. 3.

Referring to FIGS. 1, 2 and 4, to assemble the transmission device 100, initially the output shaft 80 passes through the casing 11 of the gear case 10, the second gear 30 is fixed on a free end of the output shaft 80. The shaft 21 of the first gear 20 passes through the bearing 12 of the casing 11. The first gear 20 is meshed with the second gear 30. The third gear 50 is sleeved on the shaft 21 of the first gear 20. The positioning protrusion 213 engages in the positioning groove 53, so that the first gear 20 rotates together with the third gear 50. The positioning member 41 and the resilient member 42 of the backlash adjusting mechanism 40 are received in the receiving hole 212 of the shaft 21 in that order. The drive shaft 71 of the driving member 70 passes through the cover 13 of the gear case 10. The driving member 70 is fixed on an outer sidewall of the cover 13 of the gear case 10. The fourth gear 60 fixedly sleeves on the drive shaft 71 of the drive member 70. The cover 13 is fixed to the casing 11 of the gear case 10. The shaft 21 of the first gear 20 rotatably passes through the bearing 132 of the cover 13 of the gear case 10. The fastening member 43 of the backlash adjusting mechanism 40 engages in the threaded hole 131 of the cover 13.

To adjust for the backlash between the first gear 20 and the second gear 30, a tool is used to adjust the fastening member 43, which adjusts or changes the elastic deviation of the resilient member 42. The first gear 20 and the second gear 30 are a plurality of bevel gears, as a result, a relationship between the elastic deviation of the resilient member 42 and the backlash between the first gear 20 and the second gear 30 are linearly dependent. In the illustrated embodiment, when the compression variation of the resilient member 42 has increased per 1 millimeter, the backlash between the first gear 20 and the second gear 30 has decreased 0.05 millimeters. Thereby, the transmission device 100 can adjust the backlash between the first gear 20 and the second gear 30 more conveniently and accurately.

The positioning member 41 can also be other structures, for example, a position protrusion (not shown) arranged on a bottom of the receiving hole 212 of the shaft 21. The resilient member 42 can also be a disk spring. The fastening member 43 can also be other structures, for example, a stud disposed on the cover 13 of the gear case 10. The receiving hole 212 can also be correspondingly defined in an end surface of the smaller end of the shaft 21, the resilient member 42 may be an extension spring.

Finally, while the present disclosure has been described with reference to particular embodiments, the description is illustrative of the disclosure and is not to be construed as limiting the disclosure. Therefore, various modifications can be made to the embodiments by those of ordinary skill in the art without departing from the true spirit and scope of the disclosure as defined by the appended claims.

What is claimed is:

1. A transmission device comprising:
a gear case defining a threaded hole;
a first gear comprising a shaft and received in the gear case, the shaft defining a receiving hole in an end surface thereof;
a second gear received in the gear case and meshed with the first gear; and
a backlash adjusting mechanism comprising a resilient member and a fastening member, wherein both of the first gear and the second gear are a plurality of bevel gears, the fastening member is adjustably engaged in the threaded hole of the gear case, opposite ends of the resilient member are respectively received in the threaded hole and the receiving hole, and resist the fastening member and an end of the shaft of the first gear, respectively, an elastic variation of the resilient member is adjusted by the fastening member, such that a backlash between the first gear and the second gear is adjusted via the resilient member.

2. The transmission device of claim 1, wherein the resilient member is a compression spring partly received in the receiving hole.

3. The transmission device of claim 2, wherein the backlash adjusting mechanism further comprises a positioning member received in the receiving hole, and the resilient member sleeves on the positioning member.

4. The transmission device of claim 3, wherein the positioning member is a guide ball received in the receiving hole.

5. The transmission device of claim 1, wherein the gear case comprises a casing and a cover sealed on the casing, the cover defines the threaded hole, and the fastening member is an adjusting screw engaging in the threaded hole.

6. The transmission device of claim 1, further comprising a third gear sleeved on the shaft, and the third gear driving the first gear to rotate.

7. The transmission device of claim 6, further comprising a fourth gear meshed with the third gear.

8. The transmission device of claim 7, further comprising a driving member fixed on an outer surface of the gear case and pivotally connected to the fourth gear.

9. The transmission device of claim 7, wherein the third gear defines a shaft hole in a middle portion thereof and a positioning groove adjacent to the shaft hole; the first gear further comprises a positioning protrusion engaging in the positioning groove of the third gear.

10. The transmission device of claim 1, further comprising an output shaft fixed to the second gear.

11. A transmission device, comprising:
a gear case defining a threaded hole
a first gear comprising a shaft and received in the gear case, the shaft defining a receiving hole in an end surface thereof;
a second gear meshed with the first gear;
a fastening member adjustably engaged in the threading hole of the gear case; and
a resilient member resisting the fastening member and an end of the shaft of the first gear, respectively, the resilient member partly received in the threaded hole, and partly received in the receiving hole, wherein both of the first gear and the second gear are a plurality of bevel gears, an elastic variation of the resilient member is changed by the fastening member, such that a backlash between the first gear and the second gear is adjusted via the resilient member.

12. The transmission device of claim 11, wherein the resilient member is a compression spring received in the receiving hole.

13. The transmission device of claim 12, further comprising a positioning member received in the receiving hole, and the resilient member sleeves on the positioning member.

14. The transmission device of claim 13, wherein the positioning member is a guide ball received in the receiving hole.

15. The transmission device of claim 11, wherein the gear case comprises a casing and a cover sealed on the casing, the cover defines the threaded hole, and the fastening member is an adjusting screw engaging in the threaded hole.

16. The transmission device of claim 11, further comprising a third gear sleeving on the shaft, and the third gear driving the first gear to rotate.

17. The transmission device of claim 16, further comprising a fourth gear meshed with the third gear.

18. The transmission device of claim 17, further comprising a driving member fixed on outer surface of the gear case and pivotally connected to the fourth gear.

19. The transmission device of claim 17, wherein the third gear defines a shaft hole in a middle portion thereof and a positioning groove adjacent to the shaft hole; the first gear further comprises a positioning protrusion engaging in the positioning groove of the third gear.

20. The transmission device of claim 11, further comprising an output shaft fixed to the second gear.

* * * * *